United States Patent
McClure et al.

(10) Patent No.: US 11,515,053 B2
(45) Date of Patent: *Nov. 29, 2022

(54) MOBILE HEAT PIPE COOLED FAST REACTOR SYSTEM

(71) Applicant: Triad National Security, LLC, Los Alamos, NM (US)

(72) Inventors: Patrick Ray McClure, Los Alamos, NM (US); David Duff Dixon, Elder, SD (US); David Irvin Poston, Los Alamos, NM (US); Richard J. Kapernick, Los Alamos, NM (US); Robert Stowers Reid, Santa Fe, NM (US); Venkateswara Rao Dasari, Los Alamos, NM (US)

(73) Assignee: Triad National Security, LLC, Los Alamos, NM (US)

(*) Notice: Subject to any disclaimer, the term of this patent is extended or adjusted under 35 U.S.C. 154(b) by 54 days.

This patent is subject to a terminal disclaimer.

(21) Appl. No.: 16/866,336

(22) Filed: May 4, 2020

(65) Prior Publication Data
US 2020/0373029 A1 Nov. 26, 2020

Related U.S. Application Data

(63) Continuation of application No. 14/773,405, filed as application No. PCT/US2014/034102 on Apr. 15, 2014, now Pat. No. 10,643,756.
(Continued)

(51) Int. Cl.
*G21C 15/257* (2006.01)
*G21D 5/02* (2006.01)
*G21C 1/02* (2006.01)

(52) U.S. Cl.
CPC ............. *G21C 15/257* (2013.01); *G21C 1/02* (2013.01); *G21D 5/02* (2013.01); *Y02E 30/30* (2013.01)

(58) Field of Classification Search
CPC .......... G21C 1/02; G21C 15/257; G21C 3/04; G21C 3/041; G21C 3/16; G21C 3/3213;
(Continued)

(56) References Cited

U.S. PATENT DOCUMENTS 3,546,068 A 12/1970 Schluderberg
3,866,424 A * 2/1975 Busey ...................... F22B 1/02
60/644.1
(Continued)

OTHER PUBLICATIONS

GE Oil & Gas, "Gas Turbines", 2011.
(Continued)

*Primary Examiner* — Sharon M Davis
(74) *Attorney, Agent, or Firm* — Alston & Bird LLP

(57) ABSTRACT

A mobile heat pipe cooled fast nuclear reactor may be configured for transportation to remote locations and may be able to provide 0.5 to 2 megawatts of power. The mobile heat pipe cooled fast reactor may contain a plurality of heat pipes that are proximate to a plurality of fuel pins inside the reactor. The plurality of heat pipes may extend out of the reactor. The reactor may be configured to be placed in a
(Continued)

standard shipping container, and may further be configured to be contained within a cask and attached to a skid for easier transportation.

20 Claims, 18 Drawing Sheets

Related U.S. Application Data

(60) Provisional application No. 61/816,060, filed on Apr. 25, 2013.

(58) Field of Classification Search
CPC ... F28D 15/0275; F28D 15/0266; G21D 5/02; G21D 5/08; G21D 5/12
See application file for complete search history.

(56) References Cited

U.S. PATENT DOCUMENTS

| | | | |
|---|---|---|---|
| 4,001,078 A | | 1/1977 | Doll |
| T101,204 I4 | * | 11/1981 | Hampel .................. G21D 5/02 376/221 |
| 4,462,958 A | | 7/1984 | Lacko et al. |
| 4,554,129 A | | 11/1985 | Peinado et al. |
| 4,655,989 A | | 4/1987 | Kawashima et al. |
| 4,689,194 A | | 8/1987 | Wachholz et al. |
| 5,111,662 A | | 5/1992 | Nicolin et al. |
| 5,299,242 A | * | 3/1994 | Jacox .................... G21D 5/02 376/223 |
| 2010/0040187 A1 | * | 2/2010 | Ahlfeld ................. G21C 1/022 376/367 |
| 2011/0222642 A1 | | 9/2011 | Gautier |
| 2013/0269907 A1 | | 10/2013 | Fetcu |
| 2014/0241484 A1 | | 8/2014 | Liao et al. |

OTHER PUBLICATIONS

International Search Report and Written Opinion of the International Search Authority issued in PCT Application No. PCT/US14/34102 dated Nov. 13, 2014.

M. El-Genk, "Uses of Liquid-Metal and Water Heat Pipes in Space Reactor Power Systems," Frontiers in Heat Pipes (FHP), 2, 013002, (2011 [retrieved Aug. 23, 2014]); retrieved from the Internet at https://www.thermalfluidscentral.com/journals/index.php/Heat_Pipes/article/view/292/319.

Meyer et al., "Fuel Development for Gas-Cooled Fast Reactors", ANS Summer Meeting, Jun. 2006.

P. McClure, "Very Small Reactors for Rapid Deployment," Air Force Research Laboratory, Kirtland AFB, Albuquerque, NM (Apr. 6, 2011 [retrieved Aug. 23, 2014]); retrieved from the Internet at http://www.osti.gov/scitech/biblio/1057131.

Sandra L Herrick, "Final Office Action", dated Apr. 4, 2019, U.S. Appl. No. 14/773,405.

Sandra L Herrick, "Final Office Action", dated Jul. 6, 2018, U.S. Appl. No. 14/773,405.

Sandra L Herrick, "Non-Final Office Action", dated Sep. 27, 2018, U.S. Appl. No. 14/773,405.

Sandra L. Herrick, "Final Office Action", dated Jan. 12, 2018, U.S. Patent Application No. 14/773,405.

Sandra L. Herrick, "Non-Final Office Action", dated Oct. 13, 2017, U.S. Appl. No. 14/773,405.

Sharon M Davis, "Notice of Allowance", dated Dec. 13, 2019, U.S. Appl. No. 14/773,405.

T. Trapp, "Design Description and Safety Approach," Hyperion Power Generation (Sep. 30, 2010 [retrieved Aug. 23, 2014]); retrieved from the Internet at http://pbadupws.nrc.gov/docs/ML1028/ML102880333.html.

* cited by examiner

Related Art

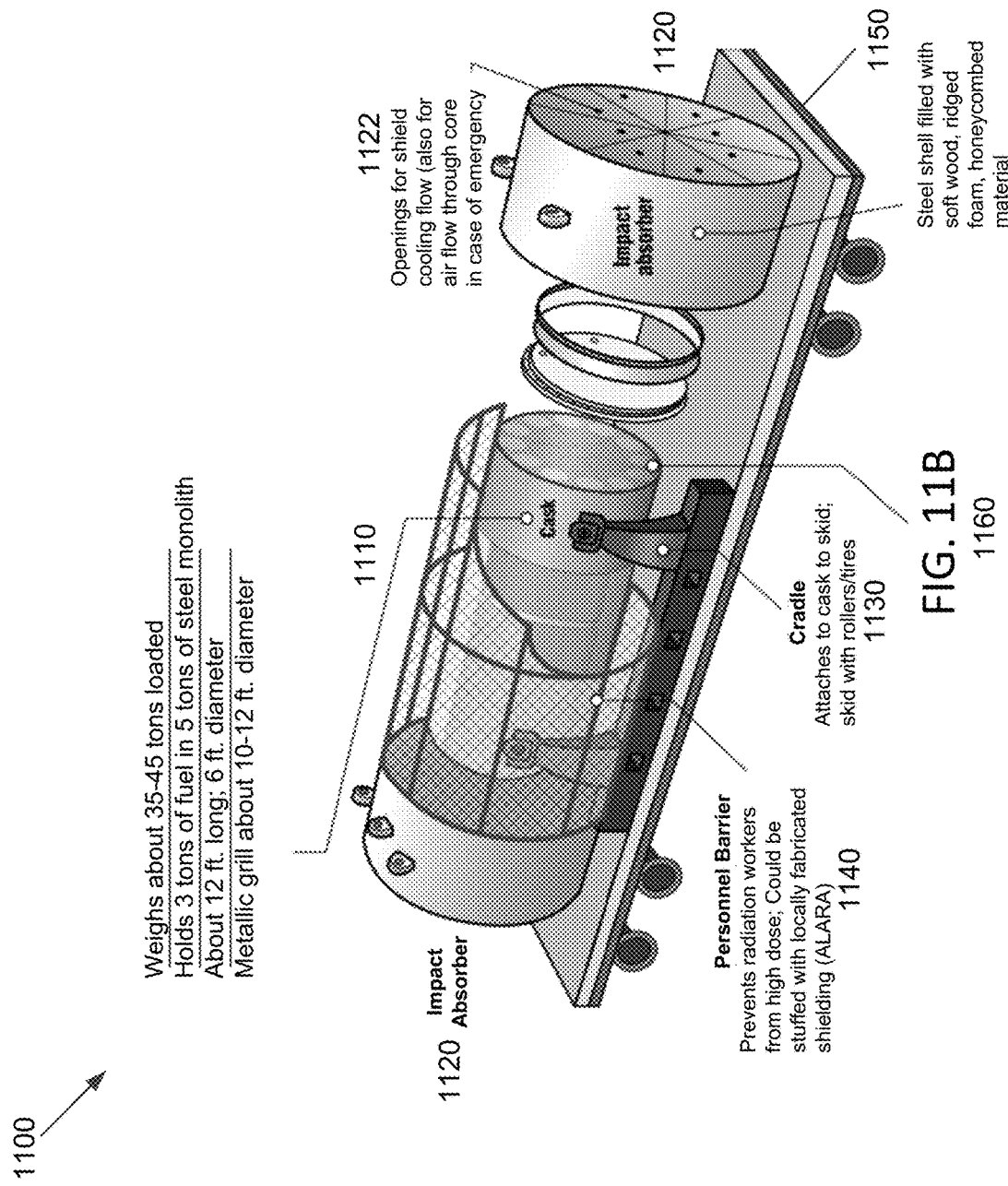

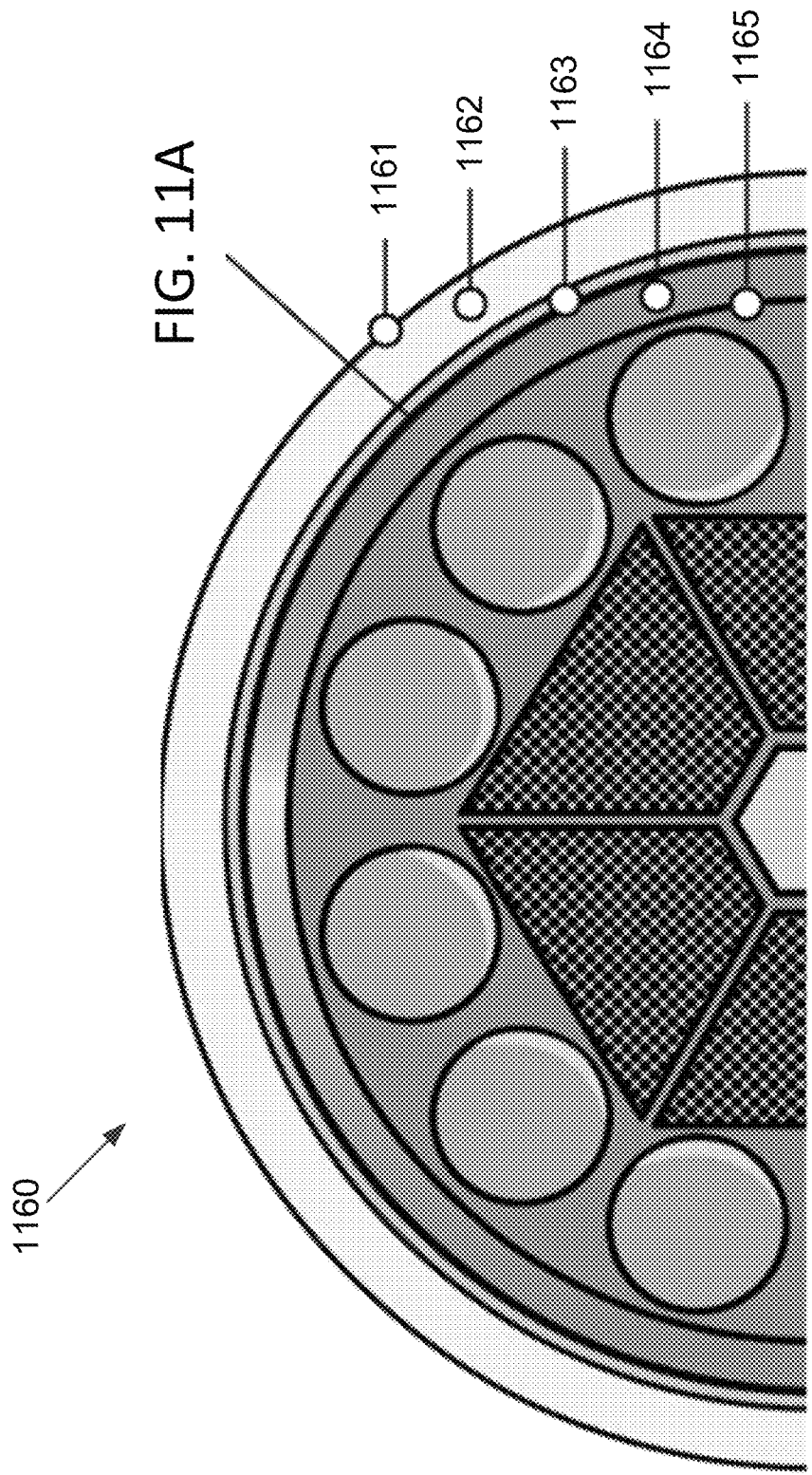

MOBILE HEAT PIPE COOLED FAST REACTOR SYSTEM

CROSS REFERENCE TO RELATED APPLICATIONS

This application is a continuation of U.S. Nonprovisional patent application Ser. No. 14/773,405 filed Sep. 8, 2015, which is a U.S. National Stage Patent Application under 35 U.S.C. § 371 of International Application No. PCT/US2014/034102, filed Apr. 15, 2014, which claims the benefit of U.S. Provisional Patent Application Ser. No. 61/816,060, filed Apr. 25, 2013. The subject matter of these earlier filed patent applications is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to power systems, and more particularly, to a mobile heat pipe cooled fast reactor system.

BACKGROUND

Conventionally, diesel or gas-powered generator systems may be used to provide electricity to locations that do not have access to a reliable electrical grid, or where an electrical grid is unavailable. However, a significant issue with these systems is that fuel must be transported to the location to supply the generator. This may require significant transportation resources and come at significant cost.

Nuclear reactors may be particularly useful for applications where power is needed for systems that are logistically remote from conventional fuel sources, such as systems deployed in the Arctic, a forward military base, or other geographically remote areas. However, conventional nuclear reactors tend to be large and require circulating coolant fluids. Accordingly, an improved reactor suited for deployment in remote environments may be beneficial.

SUMMARY

Certain embodiments of the present invention may provide solutions to the problems and needs in the art that have not yet been fully identified, appreciated, or solved by conventional reactor technologies. For example, some embodiments of the present invention pertain to heat pipe cooled reactor systems that are nearly solid state and have only a small amount of fluid. The reactor systems of some embodiments may be modular and configured to be transported in standard intermodal shipping containers, for example. Heat pipe reactors using alkali metal heat pipes, for example, may be particularly well suited for mobile/remote applications because they tend to be inherently simpler, smaller, and more reliable than "traditional" reactors that rely on pumping coolant through the reactor core.

In an embodiment, a system includes a plurality of heat pipes including coolant and a plurality of fuel pins containing nuclear fuel. The plurality of fuel pins are positioned proximate to the plurality of heat pipes. The heat pipes extend outward from a reactor core through a block and are configured to transfer heat away from the reactor core.

In another embodiment, a system includes a mobile heat pipe cooled fast reactor and a cask housing the mobile heat pipe cooled fast reactor. The system also includes a skid including rollers or tires and a cradle operably attached to the skid. The cradle is configured to secure the cask in place to transport the mobile heat pipe cooled fast reactor using the skid.

In yet another embodiment, an apparatus includes a containment vessel surrounded by a neutron shield. The neutron shield is surrounded by an air gap. The apparatus also includes a gamma shield that defines an outer boundary of the air gap. The air gap provides cooling for the gamma shield. The apparatus further includes an outer wall that covers the gamma shield.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 11A illustrates a mobile reactor and one version of a transportation system, according to an embodiment of the present invention.

FIG. 11B illustrates a side view of the transportation cask and reactor of FIG. 11A, according to an embodiment of the present invention.

DETAILED DESCRIPTION OF THE EMBODIMENTS

Figure 1:
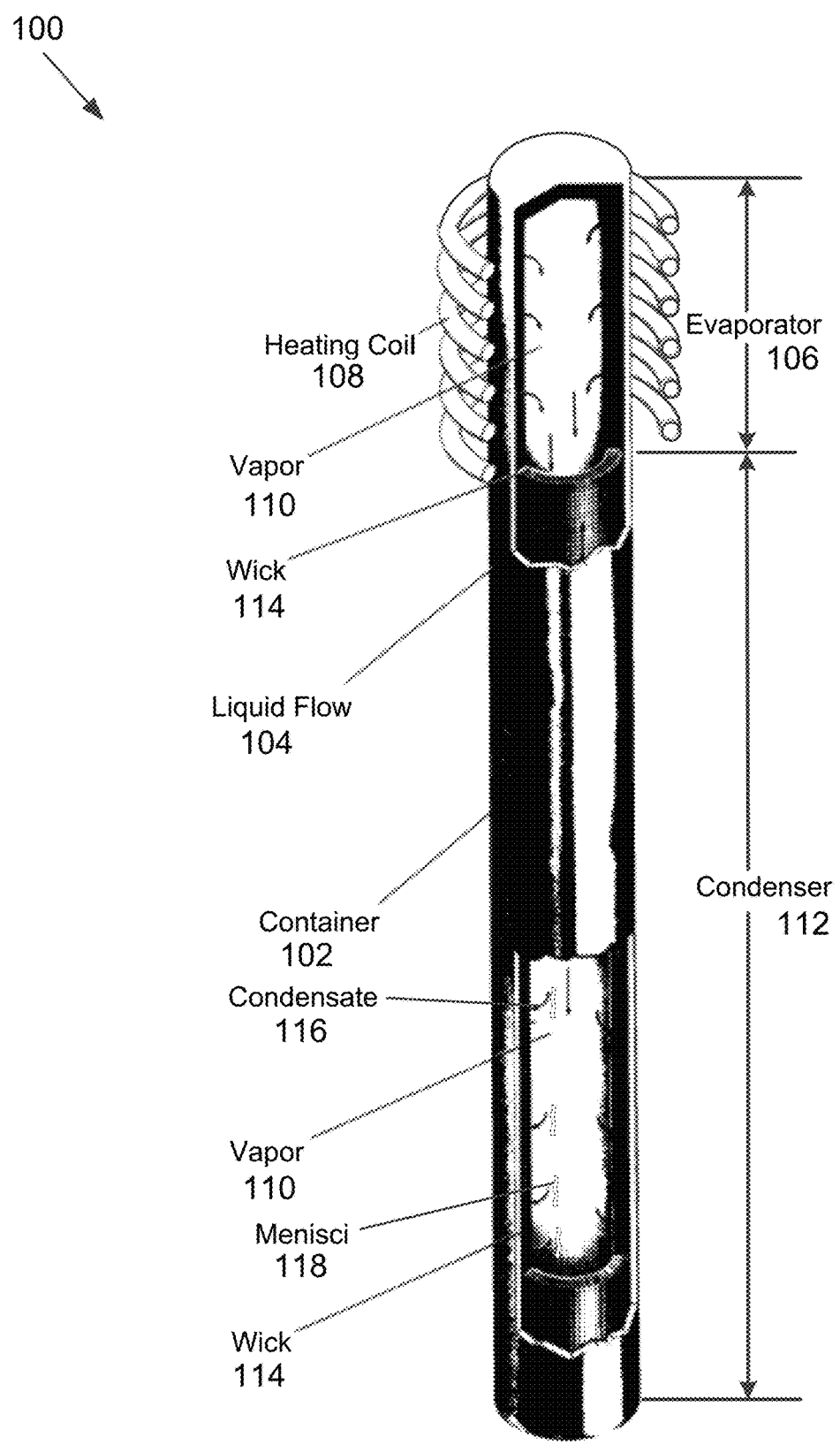
FIG. 1 illustrates a generic heat pipe, according to an embodiment of the present invention.

Some embodiments of the present invention pertain to a heat pipe cooled reactor power system that may be nearly solid state and have no circulating fluid. There are no pumps or valves in the vessel/core area like in a water or liquid metal cooled reactor. Also, other than control drums, moving parts could be limited to the power conversion system. Furthermore, high temperatures can be achieved, emergency decay heat removal can be made passive, and heat pipe reactors can generally work in any orientation. Heat pipe reactor systems in some embodiments may provide long term power in desired environments for five years or more.

Heat pipe reactors may have many advantages over conventional reactors. Their nearly solid state design and lack of circulating coolant fluid can significantly enhance safety and reliability of the reactor. Corrosion is less of an issue, and there is only a small amount of fluid that could spill, limited to the amount in the heat pipe. There are no positive void coefficients, which improves the nuclear safety case, and there is no high pressure (compared to a gas cooled reactor). Also, heat pipes increase the surface area for heat extraction and allow for multiple heat extraction systems. Some embodiments use either a carbon dioxide ($CO_2$) Brayton cycle power conversion system (air cooled) or a direct air Brayton cycle power conversion system.

Heat pipe reactors using alkali metal heat pipes, for example, are perfectly suited for mobile applications because their nature is inherently simpler, smaller, and more reliable than "traditional" reactors that rely on pumped coolant through the reactor core. Instead of the single point failure of a pumped loop reactor system, hundreds of heat pipes passively remove heat, including decay heat, from the core using relatively simple and well-characterized physics. The heat pipes remove heat as liquid in the heat pipe is vaporized. These reliability and safety advantages are especially important for remote sites. The robust, solid-state characteristics of the core are also advantageous for potentially damaging transport conditions or perhaps hostile operating environments.

The use of heat pipes instead of liquid or gas coolants may lead to a lightweight and small design as compared to conventional reactors. For mobile reactor designs, these are generally desirable attributes. In addition, heat pipe reactors may operate at high temperature, which may allow for a smaller power conversion system. This is also generally desirable for a mobile reactor.

In some embodiments, the reactor and the power conversion system may fit into a standard intermodal shipping container that is 8 ft.×8 ft.×20 ft., for example. Some embodiments of the heat pipe cooled reactor may provide a safe and reliable power source of approximately 1 to 2 megawatts ("MW") of electric power and/or provide clean water via waste heat or reverse osmosis, although some embodiments are capable of achieving 5 MW thermal or more, and any desired power output may be achieved as a matter of design choice. The heat rejection system may fit into a separate container, and another container may be used for a control room. This may allow for rapid deployment of the reactor by government agencies, the military, or other entities to areas where logistics are a concern, such as disaster areas, remote locations, remote military sites, and in spacecraft. The opportunity cost of not having to ship fuel to the location may be a significant driver for the use of such reactor technology. This may also free up more cargo space for logistical purposes since shipping fuel means not shipping other cargo, such as food, medicine, military equipment, etc.

For military applications in particular, sustainable energy at forward locations is generally a vital need. It typically takes approximately 7 gallons of fuel to supply one gallon to a fossil fuel generator. Furthermore, the majority of improvised explosive device ("IED") fatalities have occurred while protecting fuel convoys.

In some embodiments, a heat pipe reactor system may produce approximately 2 MW and weigh approximately 35 metric tons. Such embodiments may be transportable by air (e.g., by C-17 aircraft) and highway (e.g., by truck), allowing deployment to forward battlefield locations or other remote locations. These embodiments may enable savings of 92.5% of the fuel used at forward military bases, for example. An equivalent 2 MW fossil fuel generator would consume approximately 1.2 million gallons of JP8 fuel per year. An equivalent photovoltaic (PV) system and battery would weigh approximately 1,236 metric tons.

Such deployable embodiments may be configured to be "wheeled into" and "wheeled out of" a forward location. In certain embodiments, the entire system can be connected to generators and fully operable within 72 hours of arrival. Furthermore, such embodiments may be shut down, cooled, disconnected, and wheeled out in less than a week. The reactor is shut down by either turning control drums at the reactor core edge or by inserting a central control rod. The reactor core and other critical equipment may be housed in special armor, such as boron carbide, lead, and/or steel, for example. This armor may protect the reactor system from attacks, as well as shield personnel and equipment from core radiation during operation and transport.

FIG. 1 illustrates a heat pipe 100, according to an embodiment of the present invention. Heat pipes are passive heat removal devices that efficiently move thermal energy. Heat pipes are sealed tubes (i.e., container 102) that contain a small amount of a volatile liquid 104 (e.g., liquid potassium or sodium). The liquid 104 is boiled at one end of the tube (i.e., evaporator 106) via heating coil 108 and the vapor 110 travels to the other end of the tube (i.e., condenser 112) where it condenses (i.e., condensate 116), depositing its heat of vaporization with a small attendant temperature change. The condensed liquid is then returned to the other end of the tube by means of a wick 114 using capillary forces, drawing the condensate 116 back toward the heated zone. The shape of heat pipe wick 114 imposes order on a saturated liquid by: (1) forming menisci 118 between the condensate 116 and the vapor 110; and (2) allowing the condensate 116 to flow toward the heated zone. As such, a heat pipe, being isothermal, moves the working fluid for power conversion away from, and outside of, the core. Heat pipes also may extend the surface area available for heat transfer.

In conventional reactors, a single reactor coolant is typically the only mechanism for extracting heat from the reactor core. Safety is achieved by attempting to prevent the set of failures that could lose the fluid, cause the fluid not to circulate, or cause the fluid to lose its heat transfer capabilities (e.g., transition from nucleate to film boiling). Redundant equipment (pumps, electrical systems, etc.) or passive components are usually used to attempt to prevent failure.

However, in heat pipe reactors of some embodiments of the present invention, an array of heat pipes is used to remove heat from the reactor core using reliable and well-characterized physics (i.e., capillary action, boiling, and condensation). Typically, unless common cause failures dominate, the failure of multiple heat pipes will be much lower than the failure rate associated with a conventional coolant system. Thus, traditional measures of safety could be an order of magnitude better in some embodiments.

In certain embodiments, the mobile heat pipe cooled fast reactor only consumes 5 g of $U^{235}$ per day (100 MW hours). The reactor also produces 1.7 g of $Pu^{239}$ per day (100 MW hours). After two years of operation, the Pu inventory would be approximately 1.2 kg and the concentration would be ~0.01% (commercial spent fuel is ~1%). Extreme core radiation generally prevents access to the fuel.

In some embodiments, the only moving parts are control rods and power conversion. This makes such embodiments close to solid state. The feed mechanism for normal and emergency cooling could also be gravity fed. Assuming that there are no structural issues, this could improve reliability. It could also reduce maintenance costs and increase the ease of operation.

Figure 2:
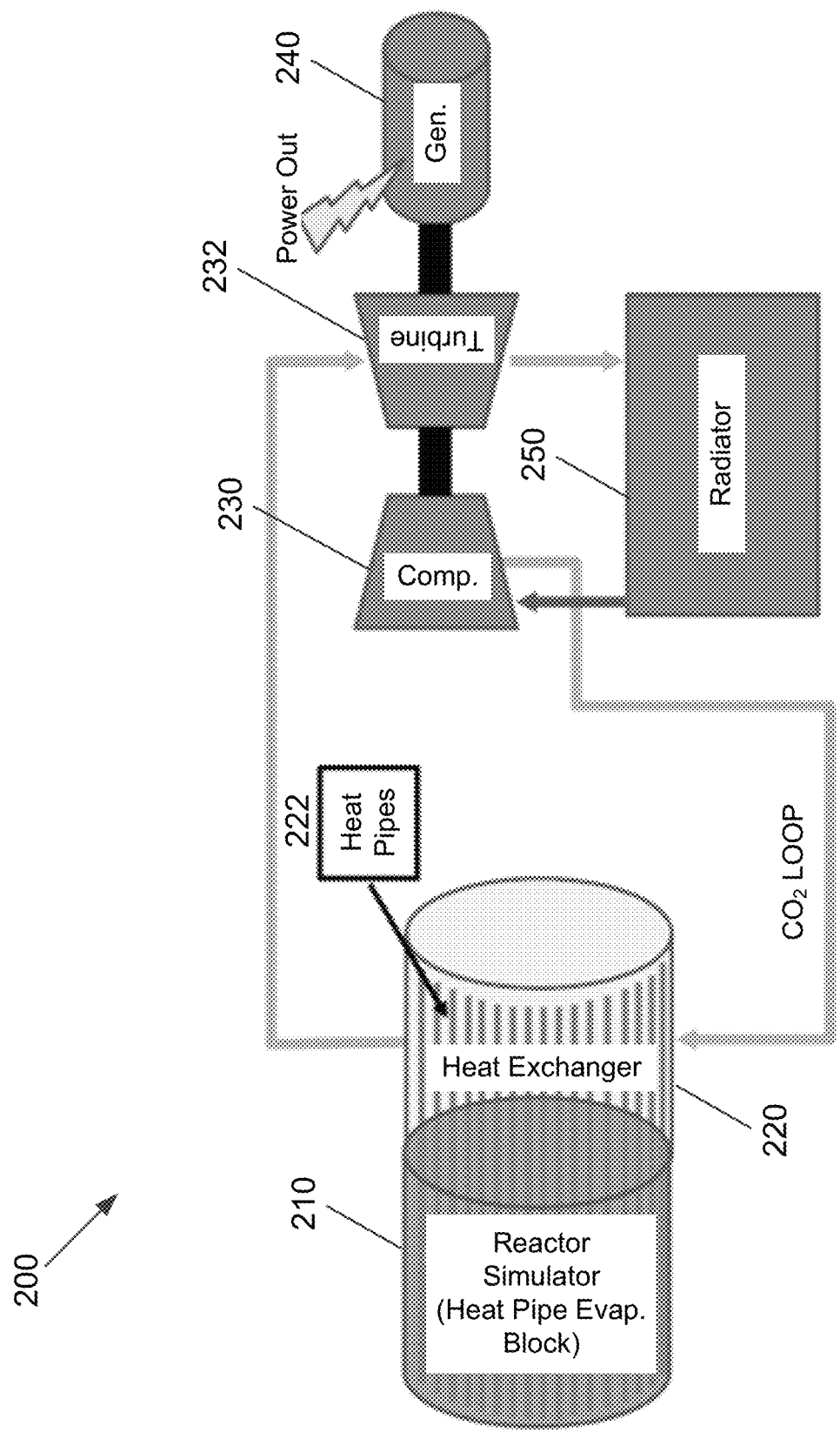
FIG. 2 illustrates a power system with closed loop $CO_2$ Brayton cycle power conversion, according to an embodiment of the present invention.

FIG. 2 illustrates a power system 200 with closed loop $CO_2$ Brayton cycle power conversion, according to an embodiment of the present invention. Power system 200 generally requires a heat rejection system, but tends to be more efficient than open air Brayton cycle systems. The pressure used in such systems may be moderate (e.g., 200 psi). Reactor 210 may have a solid core of stainless steel. While shown as a simulator here for testing purposes, in practical implementations, a real reactor would be used.

Uranium dioxide (UO2) or UN fuel, or any other suitable fissile material, may be used as a fuel source in holes in the core surrounded by an inert gas such as helium. In some embodiments, the nuclear fuel material may be hundreds of times less hazardous than material that is regularly shipped around the globe every day, such as highly toxic MOX spent fuel. Heat pipes 222 extend through reactor 210 and heat exchangers 220, and may include any suitable coolant material, such as sodium or potassium. Heat pipes 222 may connect to several heat exchangers. One heat exchanger may be used for heating a working fluid (gas) and one or two other heat exchangers may be used for decay heat removal. A typical Brayton power conversion system compresses the working fluid (such as CO2) using compressor 230, then passes it through the heat exchanger before releasing the gas through a turbine 232 to do work (e.g., to make electricity via generator 240) and then passing the working fluid through a heat rejection system 250 to complete the thermodynamic cycle.

Figure 3:
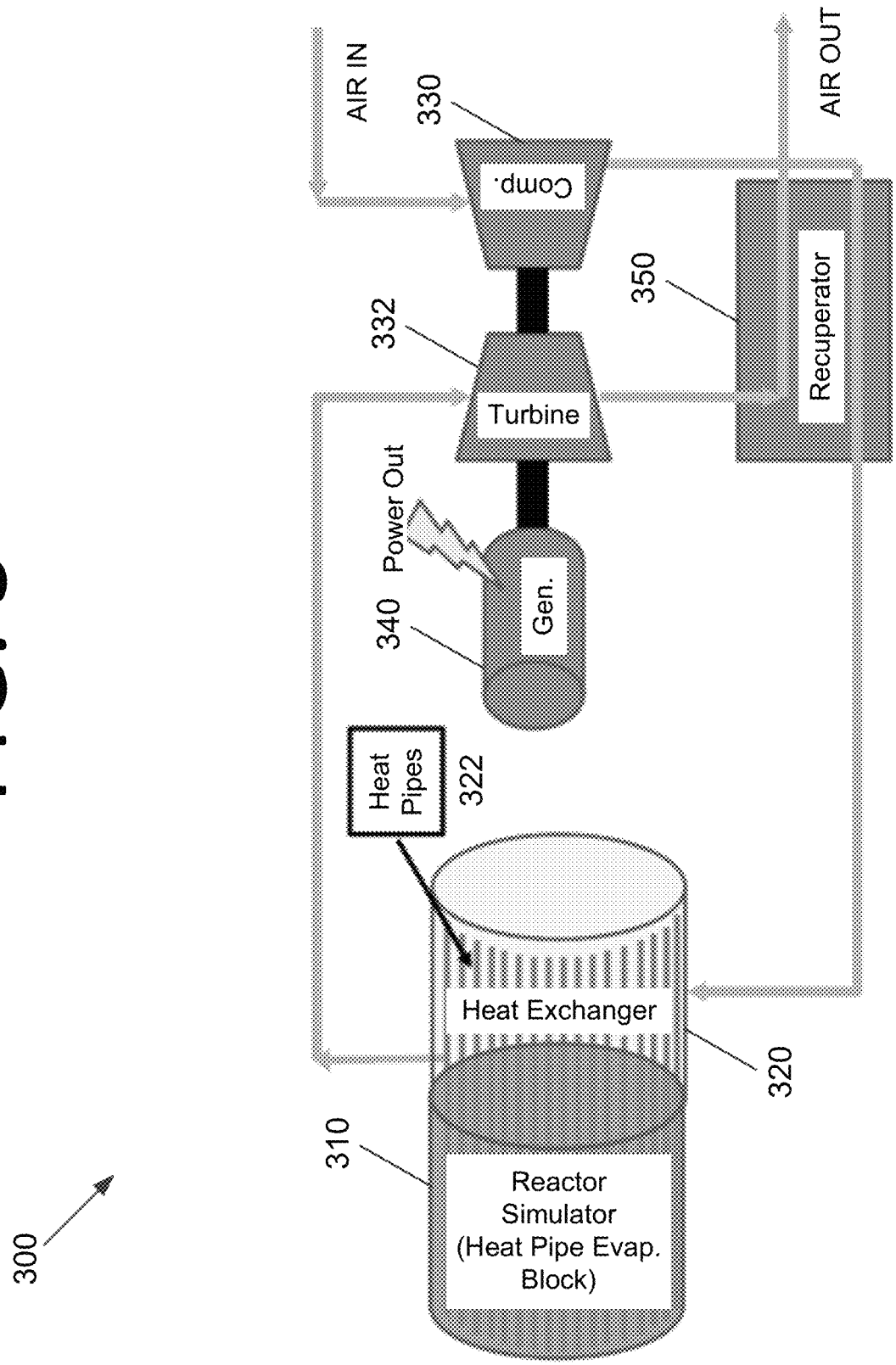
FIG. 3 illustrates a power system with air Brayton cycle power conversion, according to an embodiment of the present invention.

FIG. 3 illustrates a power system 300 with air Brayton cycle power conversion, according to an embodiment of the present invention. Power system 300 generally does not require a heat rejection system, but tends to be less efficient than a closed loop $CO_2$ Brayton cycle system. In an open air Brayton cycle, air is the working fluid and it is released into the environment instead of be cooled and recycled through the system as in a closed loop $CO_2$ Brayton cycle.

Figure 4:
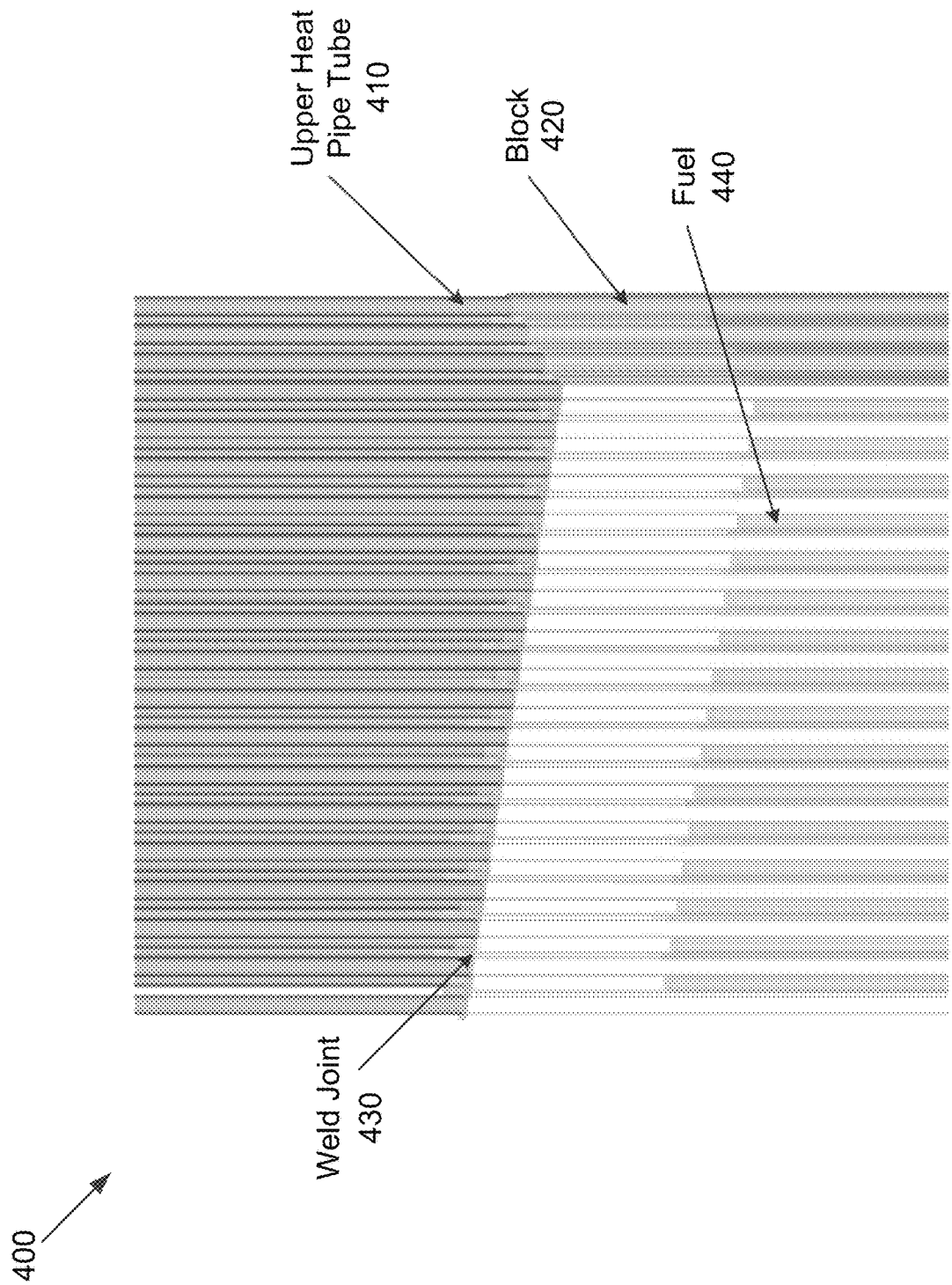
FIG. 4 illustrates an assembled core block with heat pipes, according to an embodiment of the present invention.

FIG. 4 illustrates an assembled core block with heat pipes 400, according to an embodiment of the present invention. Assembled core block with heat pipes 400 includes upper heat pipe tubes 410 that are welded to block 420 via weld joint 430. The block holds the heat pipes and fuel pins in place and allows for heat to be transferred between the heat pipes and fuel pins. Fuel 440 is positioned between the heat pipe tubes below block 420. This allows the heat pipe tubes to transfer heat derived from the fuel for external use.

Figure 5:
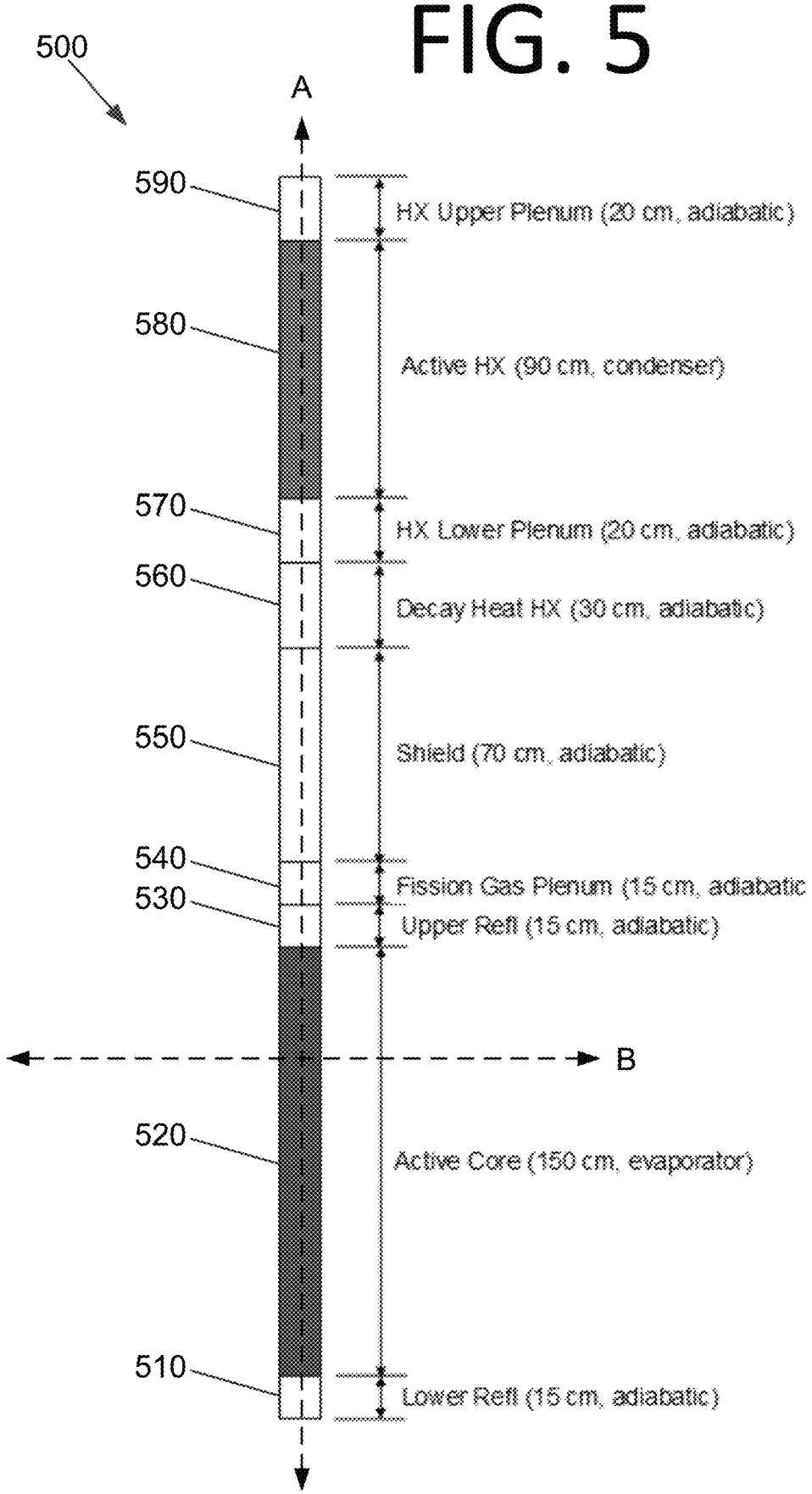
FIG. 5 illustrates reactor elevations for a closed loop $CO_2$ Brayton cycle system design, according to an embodiment of the present invention.
Figure 10:
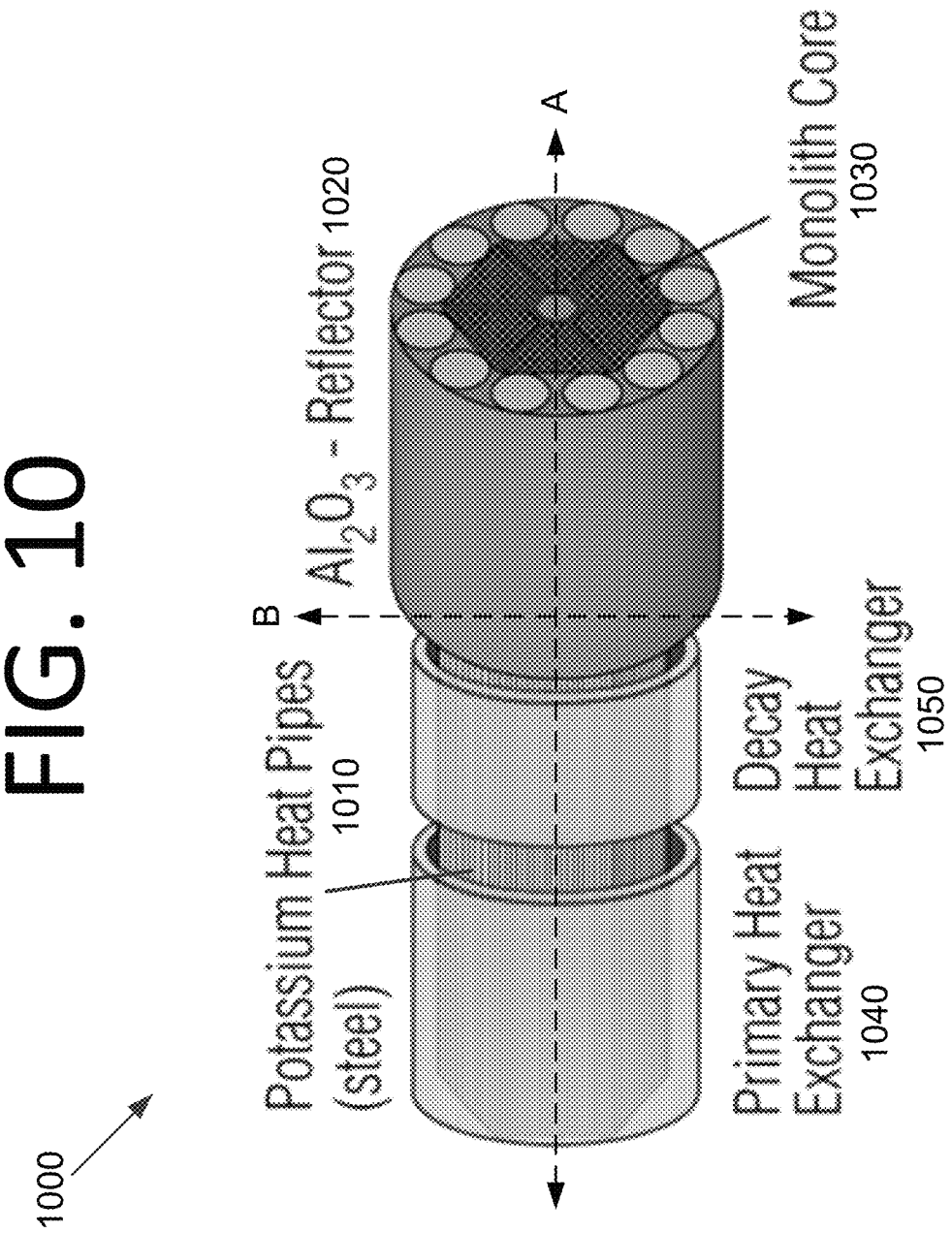
FIG. 10 is a side view of a mobile heat pipe cooled fast reactor with heat exchangers as they would be connected to the heat pipes, according to an embodiment of the present invention.

FIG. 5 illustrates reactor elevations 500 for heat pipes and fuel in the reactor core, according to an embodiment of the present invention. The elevations are given taking into account the lengths of the core reflector in the fuel pin, the fuel in the fuel pin, the fission gas plenum in the fuel pin, the shielding outside the core, the location of the lower heat exchanger for decay heat removal, and the location of the upper heat exchanger for the power conversion working fluid. A lower reflector 510 and an upper reflector 530 are located below and above an active core 520, respectively. A fission gas plenum 540 is located above upper reflector 530. A shield 550 is located above fission gas plenum 540, and a decay heat exchanger 560 is located above shield 550. An active heat exchanger lower plenum 570 and upper plenum 590 are located below and above an active heat exchanger 580, respectively. All references to "above" and "below" are in respect to the orientation shown in FIG. 5. Axes A and B, which are also shown in FIG. 10, are shown in FIG. 5 for the purpose of depicting orientation with respect to the heat pipes and fuel pins. Axis A runs parallel to the heat pipes and fuel pins of the reactor length-wise (i.e., in a direction running through the center of the heat pipes and fuel pins, but perpendicular to the circumference thereof), and axis B is defined as perpendicular to axis A (i.e., parallel to the circumference thereof).

Figure 6A:
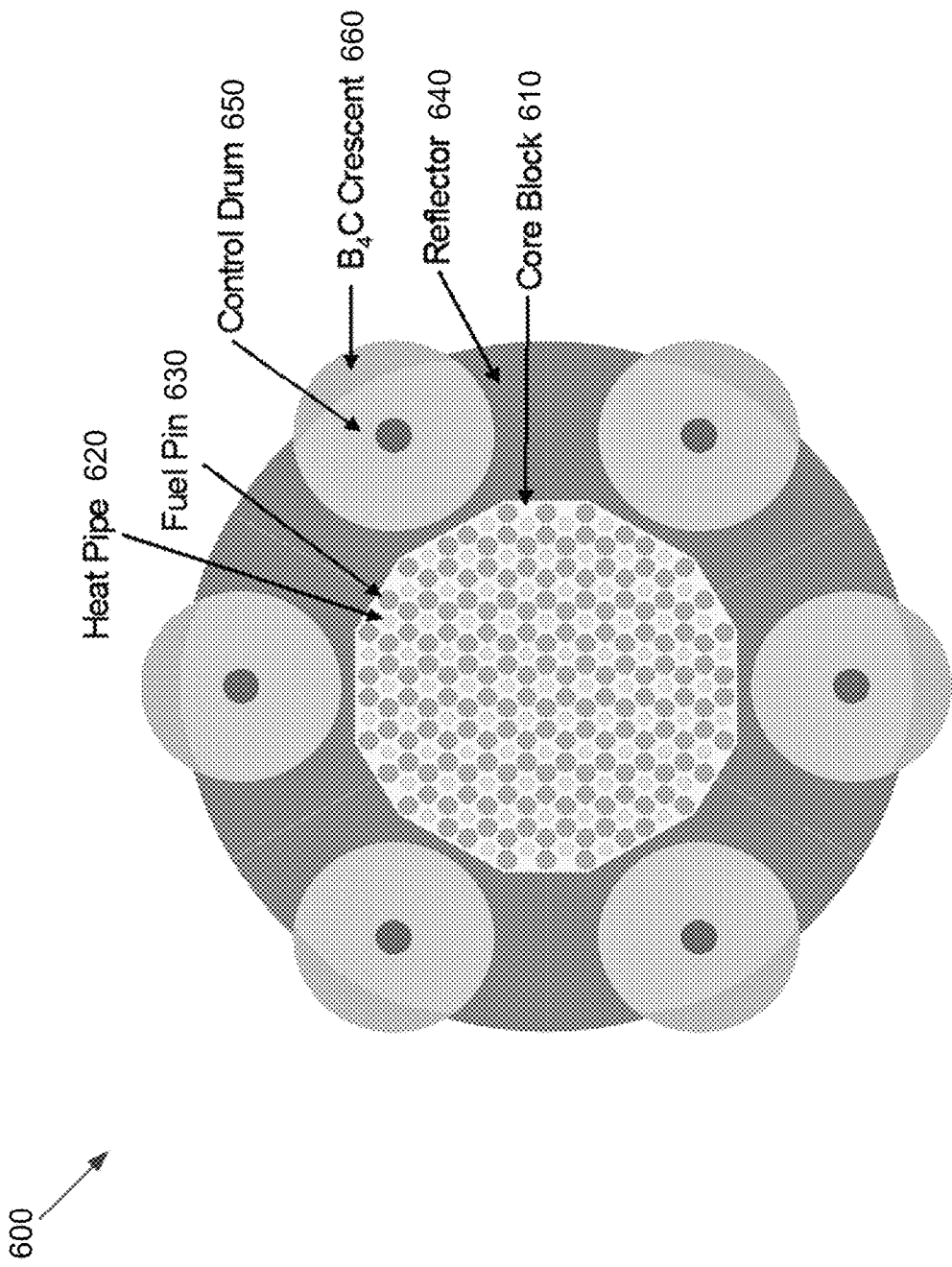
FIG. 6A is a cross-sectional view of a smaller version of a mobile heat pipe cooled fast reactor, according to an embodiment of the present invention.

FIG. 6A is a cross-sectional view of a smaller version of the mobile heat pipe cooled fast reactor 600, according to an embodiment of the present invention. Reactor 600 includes a core block 610 that houses heat pipes 620 and fuel pins 630. A reflector 640 surrounds core block 610 and scatters neutrons and gamma radiation that escapes from the core. Rotating core control drums 650 and $B_4C$ crescents 660 are used to provide reactivity control for the reactor. In some embodiments, all of control drums 650 may be moved individually to near-equal positions (i.e., all drums are at the same or a similar angle). Even if several of control drums 650 do not rotate to their respective positions, the core will still be subcritical in many embodiments.

Figure 6B:
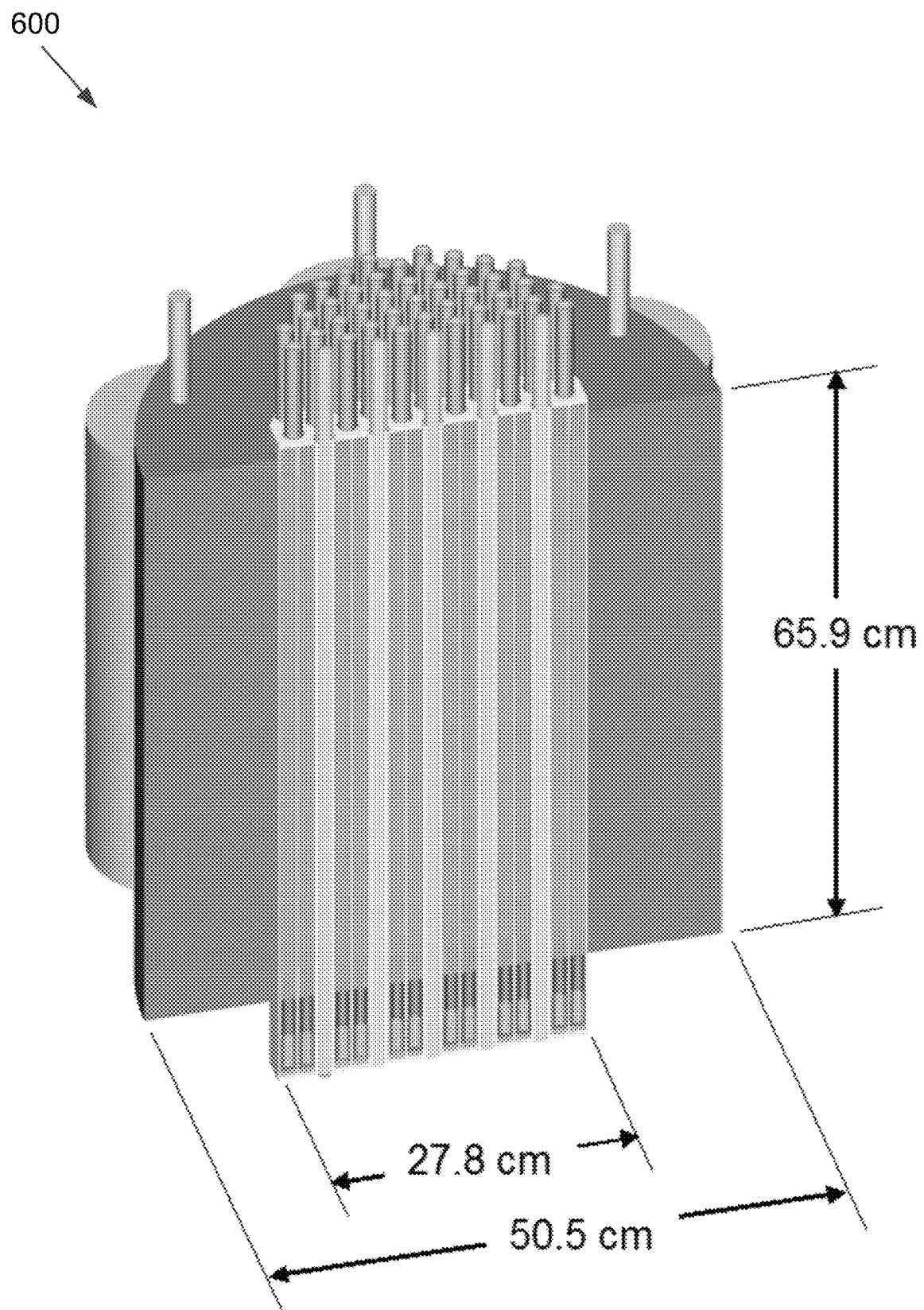
FIG. 6B is a perspective cutaway view of the smaller version of the mobile heat pipe cooled fast reactor, according to an embodiment of the present invention.

FIG. 6B is a perspective cutaway view of a smaller version of the mobile heat pipe cooled fast reactor 600, according to an embodiment of the present invention. Such a reactor may produce 250 kW of power and be suitable for a myriad of applications, including terrestrial and space applications.

Figure 7A:
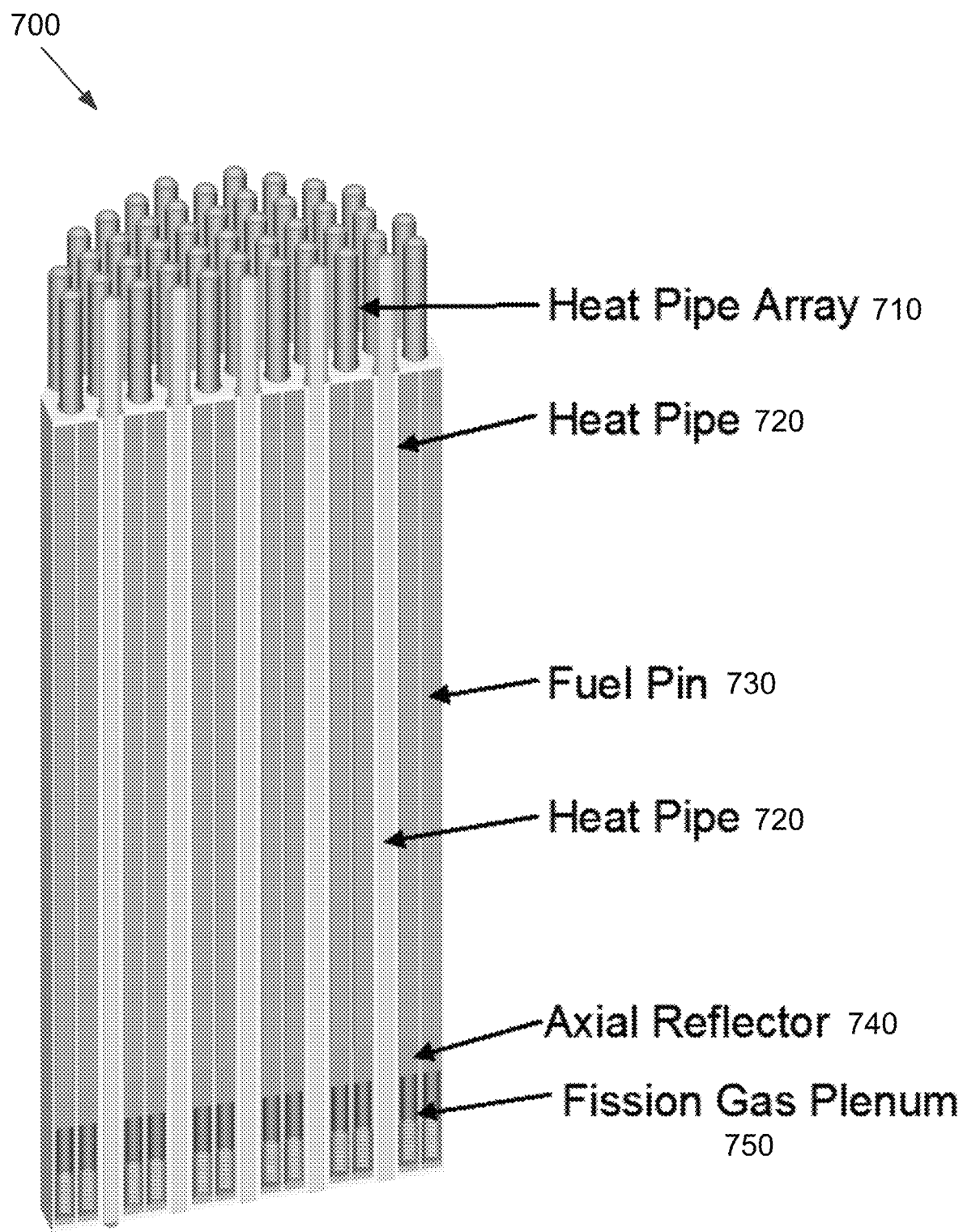
FIG. 7A is a perspective cutaway view of a smaller version of a mobile heat pipe cooled fast reactor, according to an embodiment of the present invention.

FIG. 7A is a perspective cutaway view of a mobile heat pipe cooled fast reactor 700, according to an embodiment of the present invention. A heat pipe array 710 includes a plurality of heat pipes 720. Fuel pins 730 are placed adjacent to heat pipes 720 such that heat pipes 720 can transfer heat from fuel pins 730. An axial reflector 740 scatters neutron and gamma radiation. A fission gas plenum 750 is used for containing fission gas release as the core fissions. Such embodiments may use proven $UO_2$ fuel (19% enriched) and may have a steel monolith core (not shown). Passive coupling may be used for heat pipes 720 with no moving parts. Reactor 700 may be housed in an armored and shielded cask (not shown), as shown in more detail below.

Figure 7B:
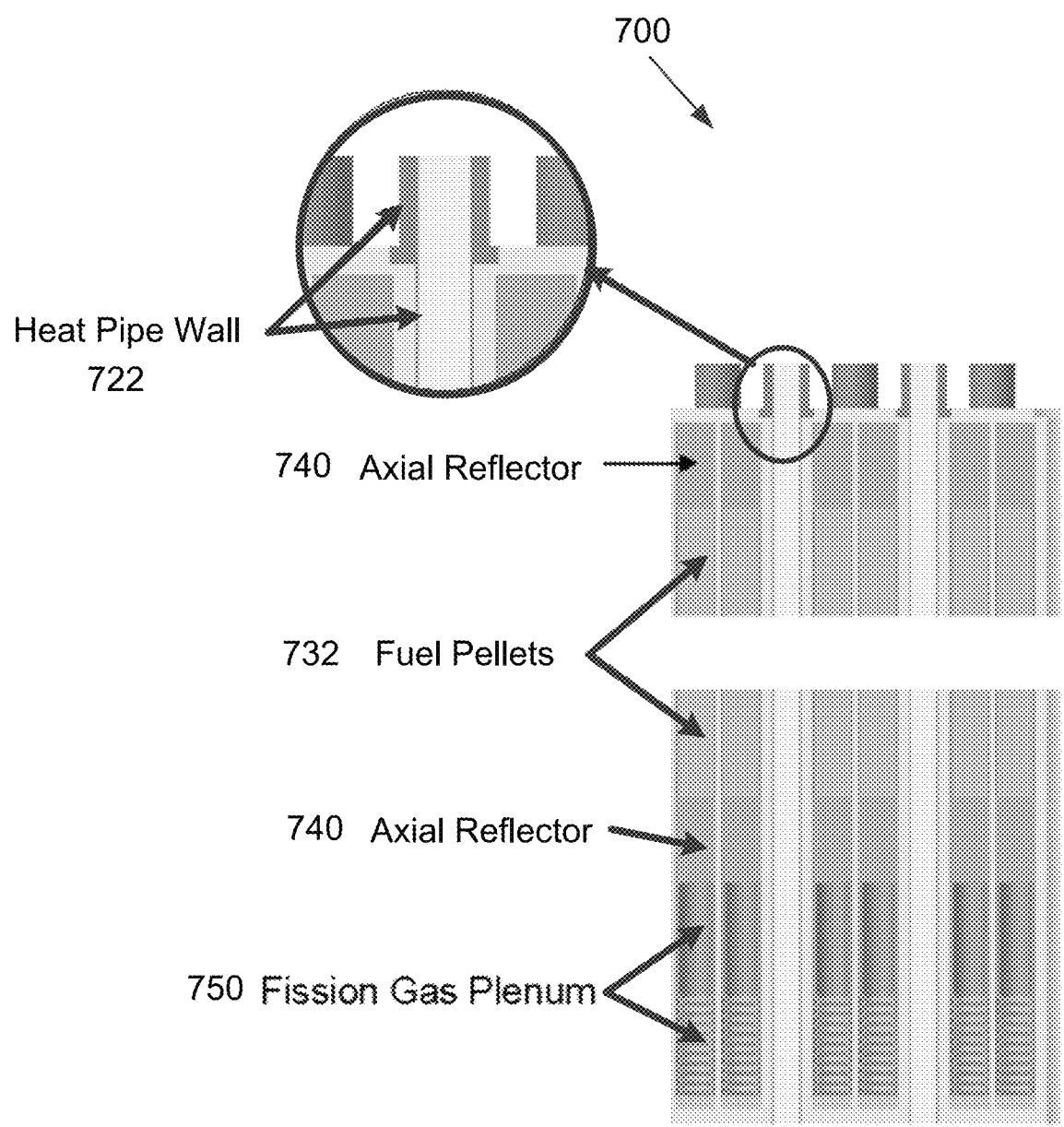
FIG. 7B is a separated side cutaway view of the smaller version of the mobile heat pipe cooled fast reactor, according to an embodiment of the present invention.

FIG. 7B is a separated side cutaway view of mobile heat pipe cooled fast reactor 700, according to an embodiment of the present invention. A heat pipe wall 722 surrounds each of heat pipes 720 showing how the heat pipes would be welded to the solid metal block core. Fuel pellets 732 include radioactive material such as $UO_2$ that serves as fissile material for reactor 700.

Figure 7C:
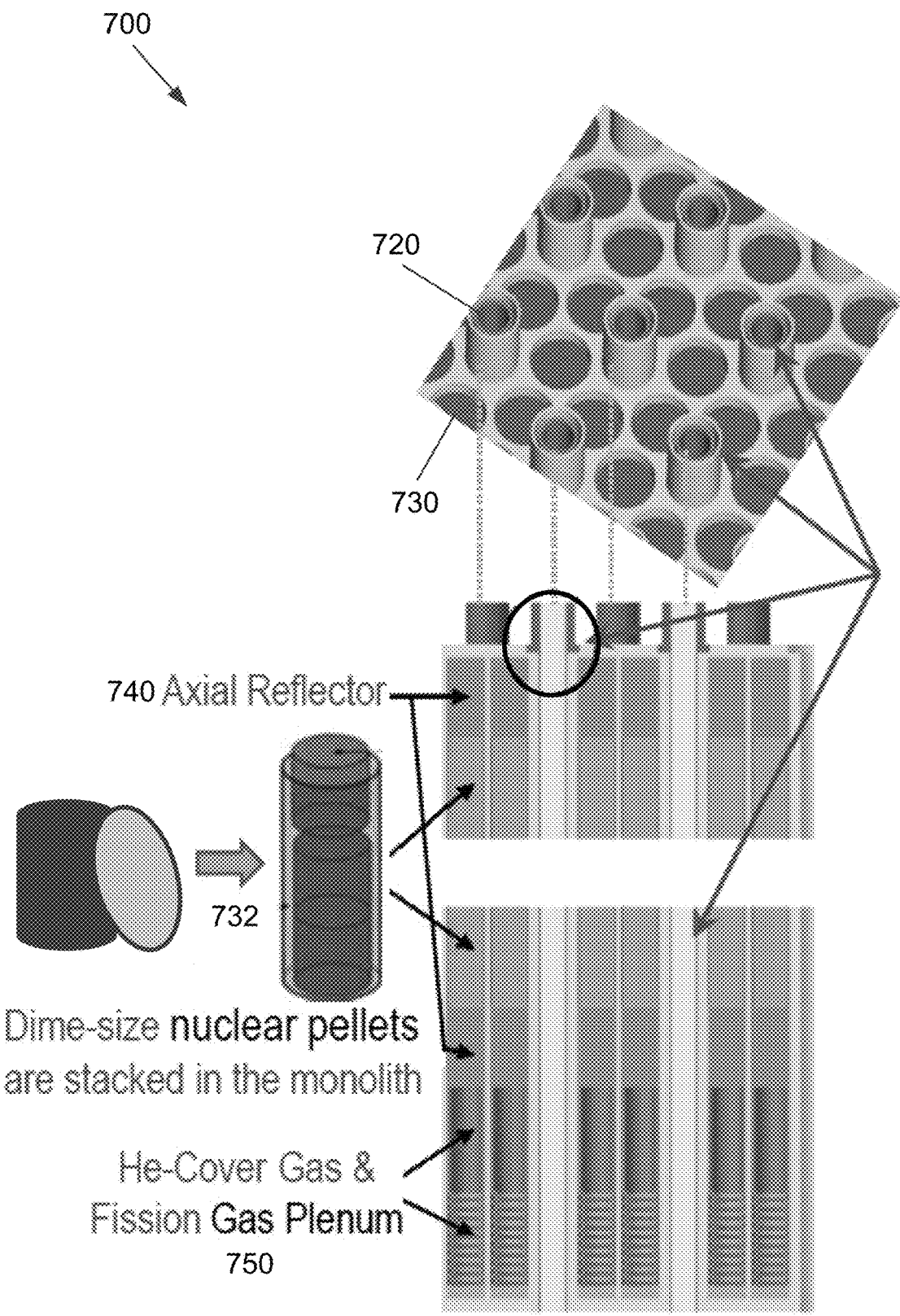
FIG. 7C is a separated side cutaway view of the mobile heat pipe cooled fast reactor with perspective views of fuel pellets and a top view of the heat pipes and fuel pins, according to an embodiment of the present invention.

FIG. 7C is a separated side cutaway view of mobile heat pipe cooled fast reactor 700 with perspective views of fuel pellets 732 and a top view of heat pipes 720 and fuel pins 730, according to an embodiment of the present invention. Dime-sized nuclear pellets 732 are stacked in the monolith in this embodiment. The core monolith in this embodiment has openings for fuel pins 730 and heat pipes 720, and may further conduct heat from fuel pins 730 to heat pipes 720. Heat pipes 720 passively transport heat generated in the core to turbine fluid, for example, to facilitate power generation.

Figure 8:
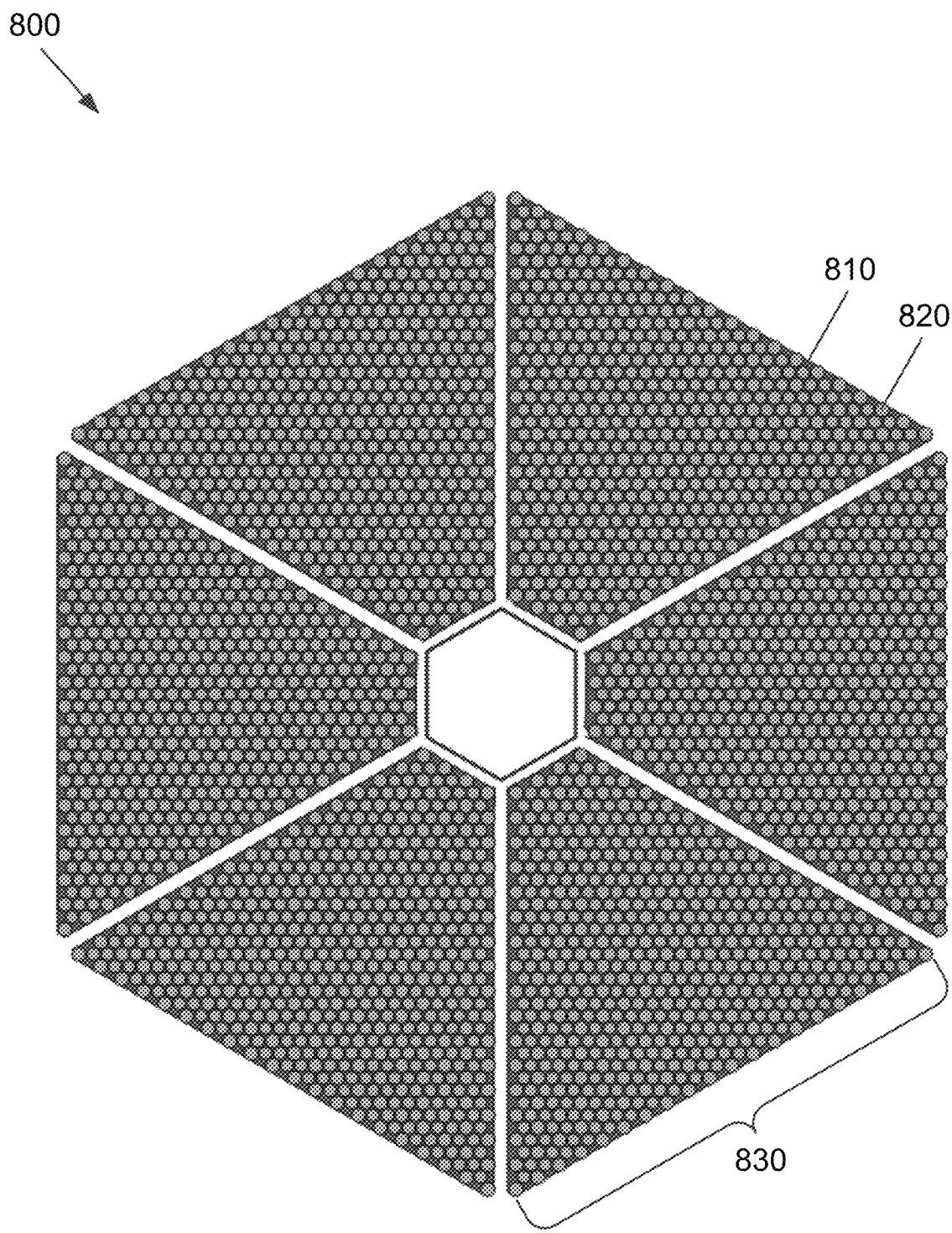
FIG. 8 illustrates a reactor core arrangement, according to an embodiment of the present invention.

FIG. 8 illustrates a reactor core arrangement 800, according to an embodiment of the present invention. Heat pipes 810 (shown slightly larger) are located proximate to fuel pins 820. Corner heat pipes 810 are adjacent to one fuel pin 820, side heat pipes 810 are adjacent to three fuel pins 820, and inner heat pipes 820 are surrounded by six fuel pins 820. In this embodiment, there are 2,112 fuel pins 820 and 1,224 heat pipes 810. Each fuel pin 820 has a diameter of 1.425 cm and each heat pipe 810 has a diameter of 1.575 cm. However, any number and arrangement of heat pipes and fuel pins may be used, depending on the application. As can be seen, the core consists of six thermally and mechanically independent segments 830, although any number of segments may be used.

The number of heat pipes in a reactor block can be a potential impediment to scaling a heat pipe reactor. Depending on the type of working fluid and the heat pipe design, most heat pipes have a limit on heat throughput per heat pipe. Given this limit, the larger the reactor, the more heat pipes that are typically required. However, there is a limit on the practical number of heat pipes that could be realistically manufactured into a solid block core.

Limits on the number of heat pipes can be overcome by breaking the core into smaller segments. A heat pipe reactor can be broken into segments that are mechanically and thermally isolated, but are neutronically connected. An example of this configuration is shown in segments 830 of FIG. 8. By limiting the segments to a size corresponding the perceived level of manufacturability, the reactor core can be scaled to the size needed for various applications. In other words, more segments can be used to generate more power.

Some embodiments use a $CO_2$ Brayton cycle power system instead of a Rankin cycle system. Some of the advantages of this configuration are that it tends to be smaller and lighter and more heat is produced (~600° C. in come embodiments), leading to a higher efficiency system with the potential for process heat applications. Also, there is less heat to reject.

$CO_2$ also has favorable properties for a Brayton system. The relatively high molecular weight is better for low power Brayton cycle heat engines. Also, low $c_p/c_v$ (1.2) leads to low pumping power. Further, better performance than a HeXe mixture at similar molecular weight may be realized.

Figure 9:
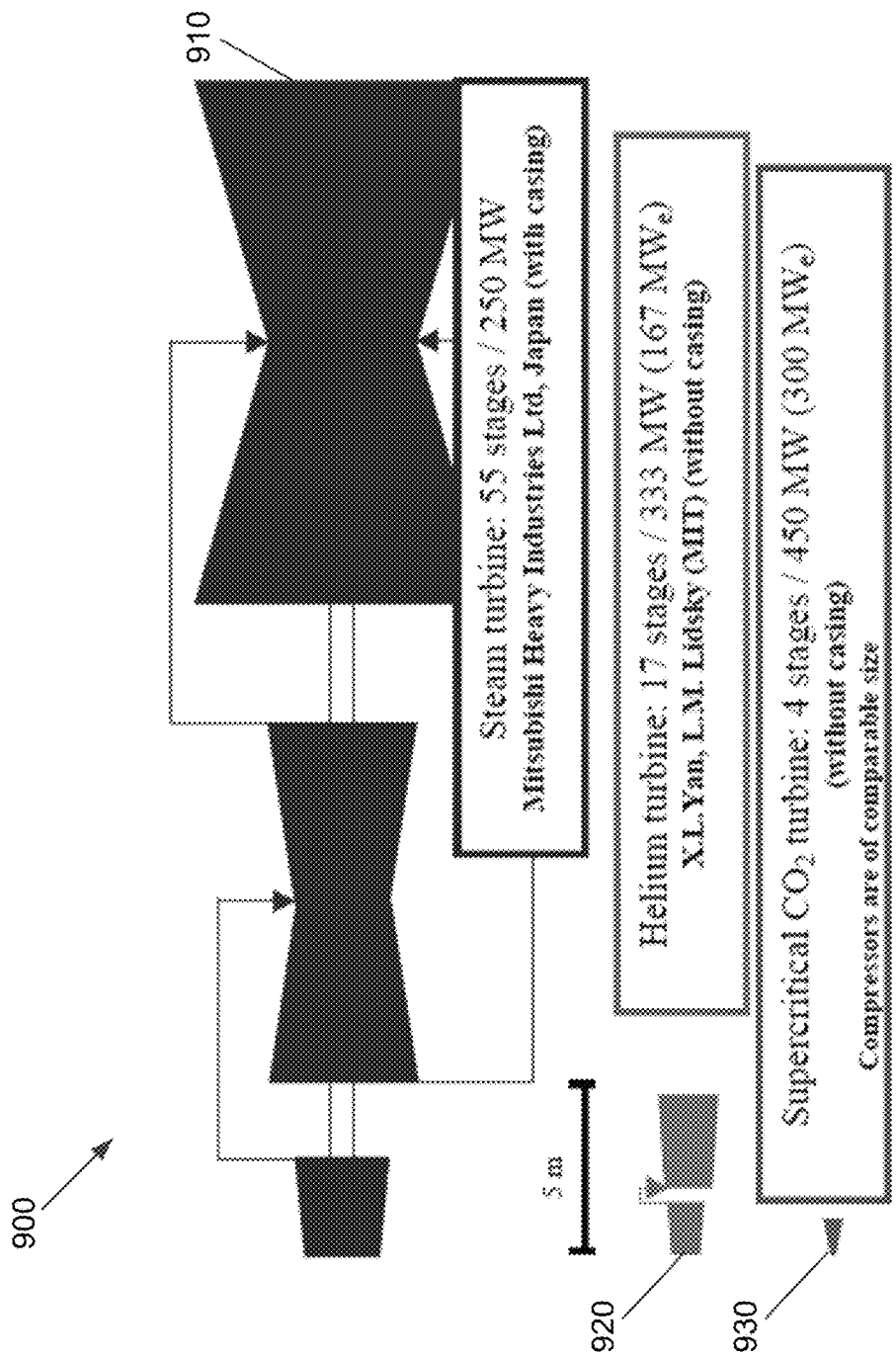
FIG. 9 illustrates comparative turbine sizes for He and supercritical $CO_2$.

FIG. 9 illustrates comparative turbine sizes 900 for He and supercritical $CO_2$. As can be seen, steam turbine 910 is the largest and produces 250 MW using 55 stages. He turbine 920 produces 333 MW using 17 stages, and the size is reduced to approximately 5 m. Supercritical $CO_2$ turbine 930 is smaller still and produces 450 MW using only 4 stages.

FIG. 10 is a side view of a mobile heat pipe cooled fast reactor 1000, according to an embodiment of the present invention. Reactor 1000 includes potassium filled heat pipes 1010 with a steel casing. An $Al_2O_3$ reflector 1020 surrounds a monolith core 1030 and reflects neutron and gamma radiation. A primary (i.e., active) heat exchanger 1040 exchanges heat from nuclear reactions to a power conversion cycle and a decay heat exchanger 1050 exchanges heat from decay of the fuel material out of reactor 1000. As in FIG. 5, axes A and B are shown for the purpose of depicting orientation. Axis A runs parallel to heat pipes 1010 lengthwise in reactor 1000 (i.e., in a direction running through the center of the heat pipes, but perpendicular to the circumference thereof), and axis B is defined as perpendicular to axis A (i.e., parallel to the circumference thereof).

FIG. 11A illustrates a mobile reactor and transportation system 1100, according to an embodiment of the present invention. In this embodiment, a cask 110 containing a mobile reactor is secured to a skid with rollers/tires 1150, but a train car, truck, container, or any other transportation mechanism may be used in other embodiments. Cask 1110 with the mobile reactor inside weighs about 35-45 tons loaded, holds three tons of fuel in five tons of steel monolith, and is approximately 12 feet long with a 6 foot diameter. Cask 1110 is designed to be robust, and the boron carbide shield (see FIG. 11B) also acts as armor.

Two impact absorbers 1120 are at either end of cask 1110. Openings 1122 are provided for shield cooling flow and also for airflow through the core in case of an emergency. Impact absorbers 1120 may include a steel shell filled with soft wood, ridged foam, honeycombed material. A cradle 1130 attaches cask 1110 to skid 1150 and a personnel barrier 1140 protects workers from exposure to a high dose of radiation. Personnel barrier 1140 may be stuffed with locally fabricated shielding (ALARA) in some embodiments.

FIG. 11B illustrates a side view of cask and reactor 1160 of FIG. 11A, according to an embodiment of the present invention. A ¼ inch thick stainless steel outer wall 1161 contains the reactor. A four inch thick lead gamma shield 1162 deflects gamma radiation. A 1-2 inch air gap 1163 provides shield cooling for lead gamma shield 1162 and six inch thick $B_4C$ neutron shield 1164. A 1-2 inch stainless steel containment vessel 1165 separates the inner reactor from the cask.

For the mobile embodiment depicted in FIGS. 11A and 11B, a power output of 0.5 to 2 MW may be realized. Power conversion may be accomplished by coupling the reactor to a conventional power conversion system. Heat rejection may be accomplished using air or waste heat may be used for other missions. The reactor may be controlled remotely or locally. Self-regulation may be provided for power output. Embodiments may be reliable and safe, with three independent means of removing decay heat and two independent means of shutdown. The heat pipe cooled core may have no active components, passive heat removal may occur following shutdown, and a large heat capacity may be achieved.

Figure 12:
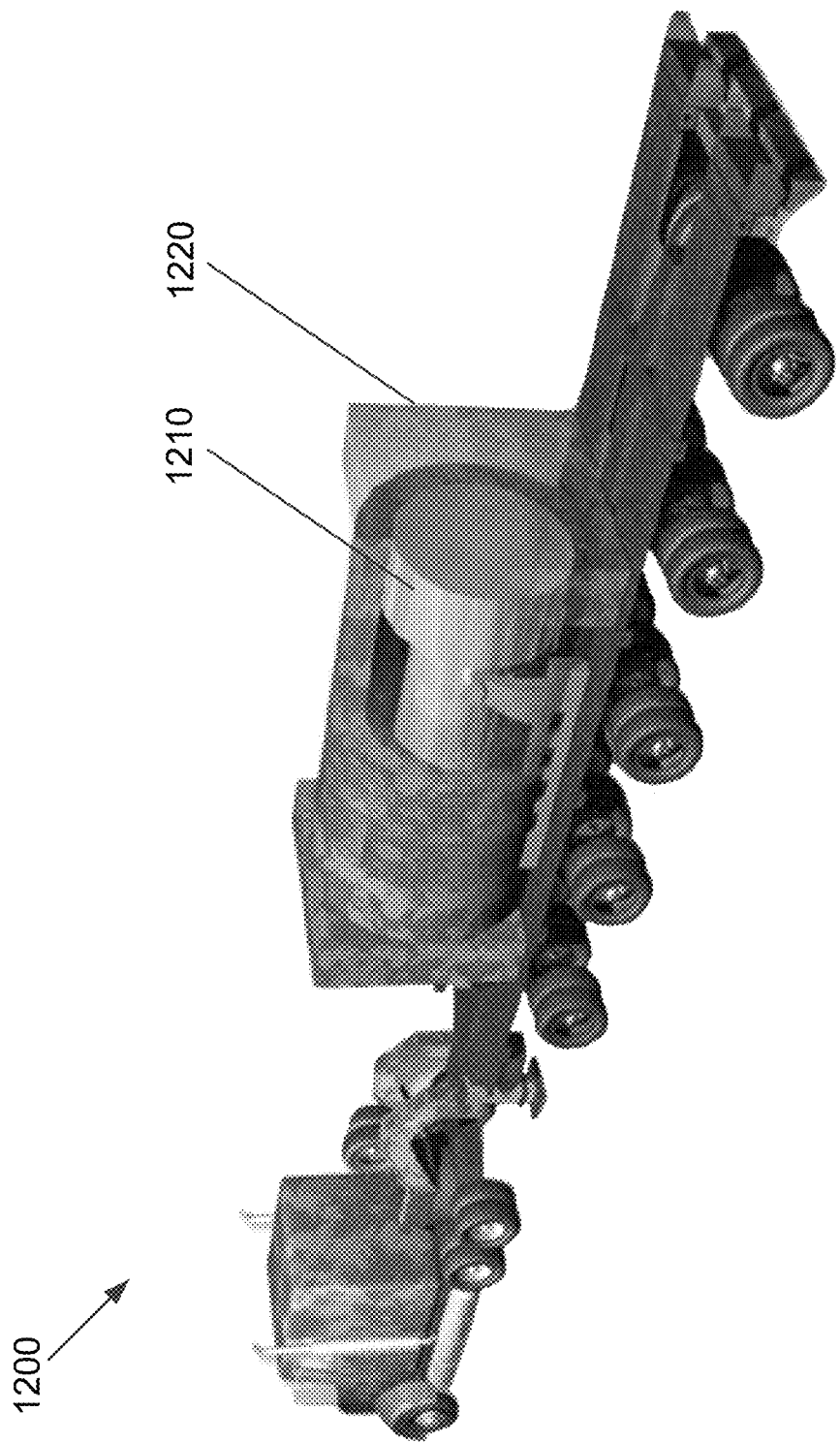
FIG. 12 is a perspective view of a truck and trailer configured to transport a mobile heat pipe cooled fast reactor, according to an embodiment of the present invention.

FIG. 12 is a perspective view of a truck and trailer 1200 configured to transport a mobile heat pipe cooled fast reactor 1210, according to an embodiment of the present invention. Reactor 1210 is contained within cask 1220, and may generate 0.5-5 MW, depending on the configuration. Cask 1220 may be an armored, shielded, and certified transport cask.

In an embodiment, which can be found in corresponding PCT Application No. PCT/US2014/034102, a non-nuclear end-to-end 200 kW prototype was used to test the heat pipe concept. The prototype has a similar heat pipe and fuel pin configuration to that shown in FIG. 7B, for example. The reflectors are $Al_2O_3$ in the prototype. A simulated nuclear reactor core used electricity to simulate nuclear power.

Complex electronics are used to simulate reactor physics feedback mechanisms during operation of the prototype. The prototype allows the simulation of the reactor to power conversion components without using an actual reactor undergoing fission.

A non-nuclear prototype core block was used in a prototype embodiment (see PCT Application No. PCT/US2014/034102). Electric heaters were used to the heat core block to temperatures that were routinely in excess of 1,200 K. The components that were fabricated and tested included heat pipes, heat exchangers, and structural elements. These components were tested for over 4,000 hours to demonstrate proof of concept.

Figure 13:
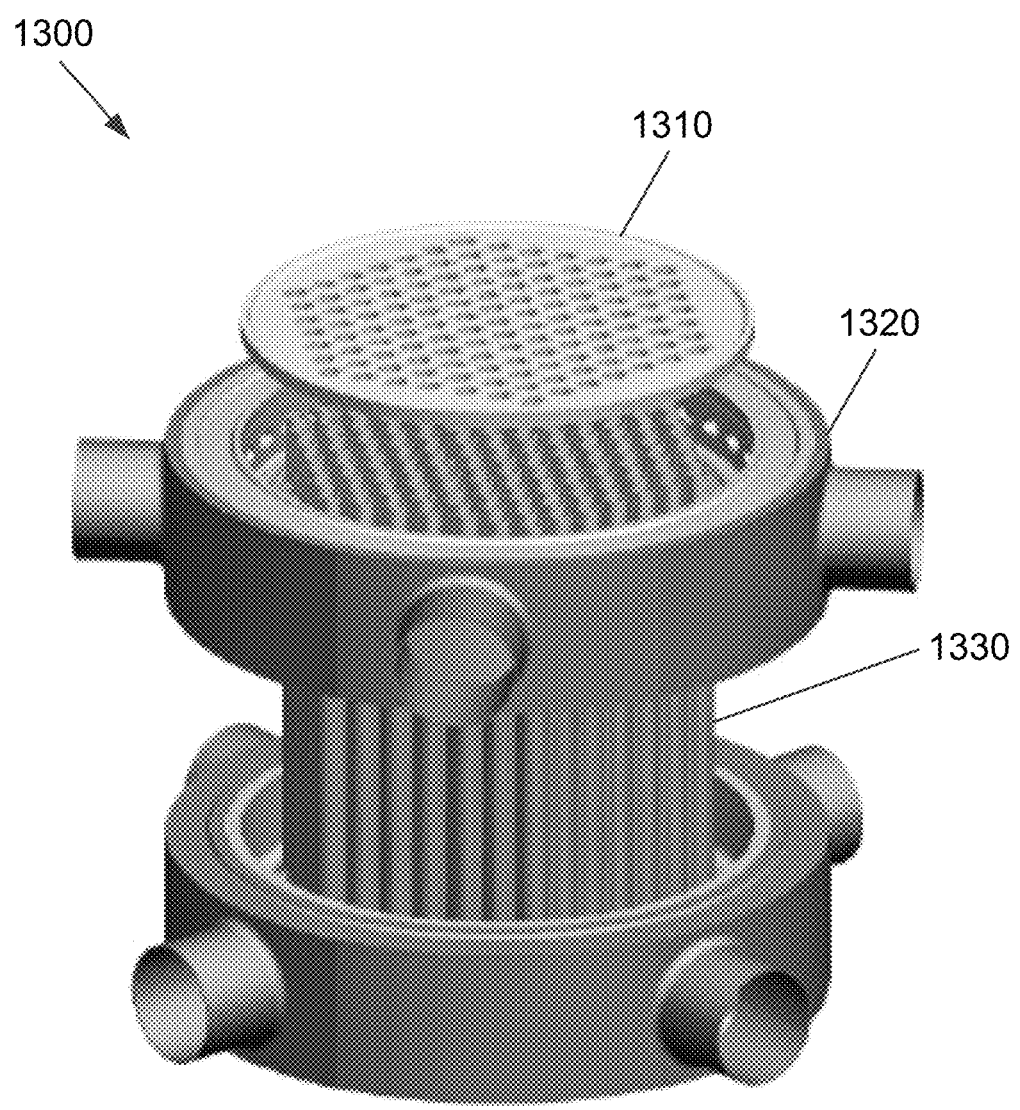
FIG. 13 is a virtual schematic of a non-nuclear prototype core block, according to an embodiment of the present invention.

FIG. 13 is a virtual schematic of a non-nuclear prototype core block 1300, according to an embodiment of the present invention. A plate 1310 holds heat pipes 1330 in place. Heat pipes 1330 contain a liquid metal such as sodium or potassium. Heat pipes 1330 are heated electrically to simulate nuclear fission. The heat from heat pipes 1330 is then delivered to heat exchangers 1320 in the same fashion that a nuclear heated core block would.

Figure 14:
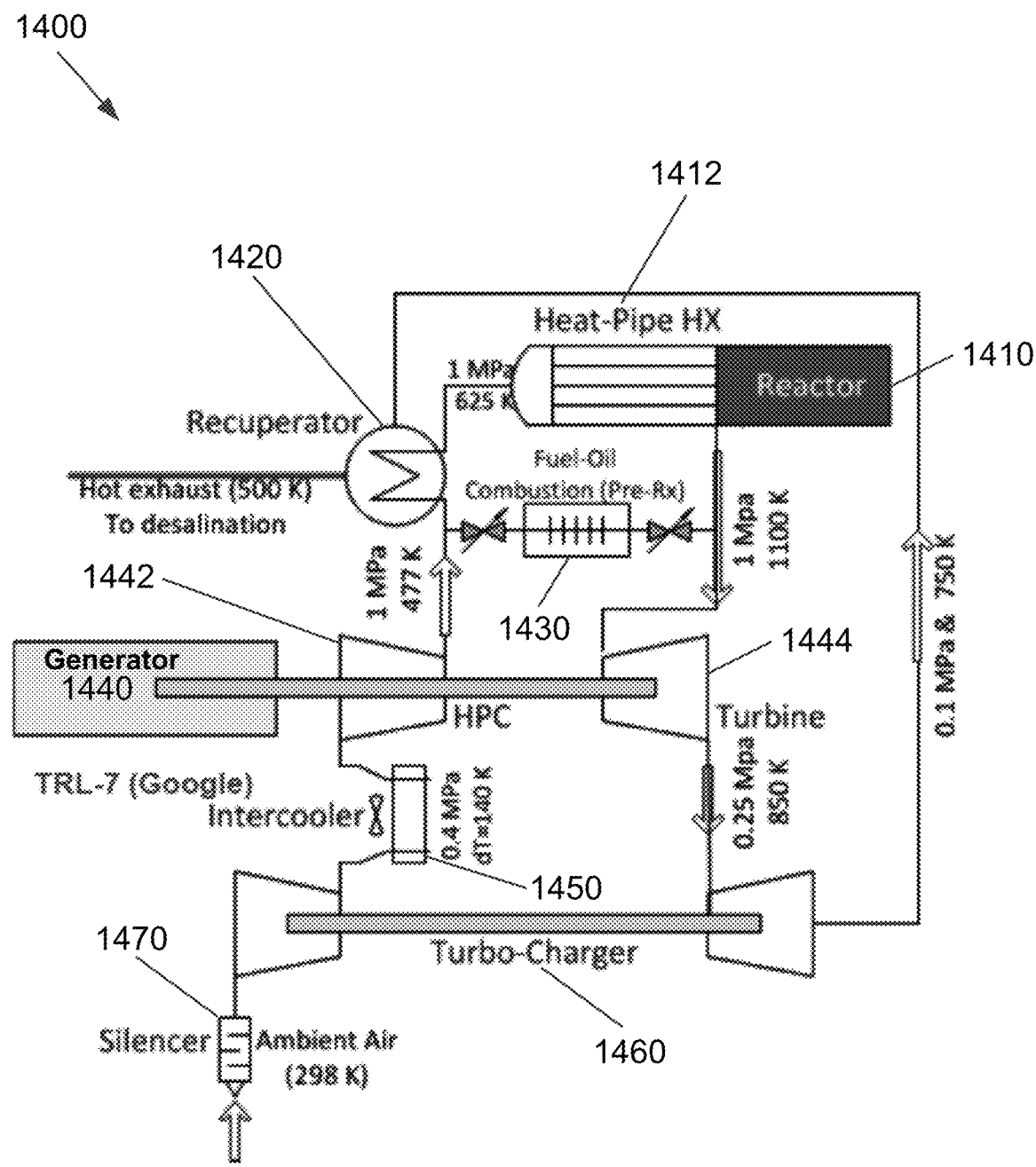
FIG. 14 is a schematic of a once-through air Brayton system, according to an embodiment of the present invention.

FIG. 14 is a schematic of a once-through air Brayton system 1400, according to an embodiment of the present invention. Fuel oil powered Brayton systems are conventionally available, and the system can be used before the nuclear reactor system arrives to provide power. The flow of system 1400 can be realigned upon arrival of mobile heat pipe cooled fast reactor 1410. Reactor 1410 includes heat pipes that are in contact with or sufficiently proximate to a heat pipe heat exchanger 1412 that is heated by reactor 1410 via the heat pipes. Heat is transferred via a working fluid (e.g., air, carbon dioxide, etc.) contained in a series of pipes. In this embodiment, a working fluid is heated via heat exchanger 1412 to approximately 1100 Kelvin (K) at a pressure of one megapascal (MPa), and the working fluid is provided to a turbine 1444 to do work. The working fluid is supplied to the "combustor" of turbine 1444 and powers turbine 1444 in a similar manner to burning fossil fuel. In some embodiments, if reactor 1410 is not present or otherwise is not working, a series of valves (not shown) may be turned in turbine 1444 to enable turbine 1444 to operate by combusting fossil fuel. Turbine 1444 and a high pressure compressor (HPC) 1442 are connected to, and drive, a generator 1440 to produce electricity.

After exiting turbine 1444, the pressure and temperature in the working fluid have been reduced to approximately 0.25 MPa and 850 K, respectively. The fluid then drives a turbocharger 1460 that accepts ambient air at approximately 298 K via a silencer 1470. The turbocharger includes an intercooler 1450 and feeds air to HPC 1442. Air provided from intercooler 1450 is at a pressure of approximately 0.4 MPA and the temperature is reduced by approximately 140 K, significantly increasing the density of the air.

Air leaving HPC 1442 is at approximately one MPa and 477K, and working fluid leaving turbocharger 1460 is at approximately 0.1 MPa and 750 K. The air and working fluid are then fed into a recuperator 1420, which is a heat exchanger configured to remove heat from the air and working fluid. Hot exhaust from recuperator 1420 at approximately 500 K is provided to a destination to be used for desalination. Working fluid at approximately one MPa and 625 K is then fed back into heat exchanger 1412 to be heated and cycle back though system 1400. The air may also be used to perform fuel-oil combustion via a combustion engine 1430 when reactor is 1410 is not connected. Alternatively, combustion engine 1430 may be used to supplement the heat generation of reactor 1410 in some embodiments.

In reactor mode, system 1400 may be altered to allow air to be compressed, heated by the heat pipes coming out of the core of reactor 1410, and then be directed to turbine 1444 in place of air heated by natural gas or diesel fuel via combustion engine 1430, for example. The design changes allow for alternate piping connections that allow reactor 1410 to be attached to system 1400.

A gas turbine may be connected by an on-site operator to a heated air outlet from a mobile heat pipe cooled fast reactor, for example. See PCT Application No. PCT/US2014/034102. This realigns the gas turbine to reactor mode, where fossil fuel is not required for its operation. In many embodiments, the generator, regulator, and programmable logic controller (PLC) need not be redesigned.

Fuel resources and conventional diesel generators may be needed to achieve the power output of mobile heat pipe cooled fast reactor systems in some embodiments. See PCT Application No. PCT/US2014/034102. In this example, the power requirements are 6 MW. In order to achieve this power output using conventional MEP-011E diesel generators, 30 generators are required, having a pad area of 5,000 square feet. Further, a weekly convoy of six tanker trucks providing 66,000 gallons of fuel is needed to run the generators.

However, a mobile heat pipe cooled fast reactor solution only requires three 2 MW reactors, having a pad area of 2,000 square feet. Thus, not only is the need for refueling eliminated, but the space required to deploy the reactors is significantly less than with a diesel generator solution. Furthermore, a smaller size of the power generator site provides a smaller target size to enemy combatants, making the reactors harder to hit with mortars, for example. Further, even if hit, the reactors may be armored as discussed above.

Conventional solar equipment and fuel resources may be needed to achieve the power output of mobile heat pipe cooled fast reactor systems in some embodiments. See PCT Application No. PCT/US2014/034102. Solar power does not have 100% availability, i.e., it only works well when there is little or no cloud cover. As such, solar systems require a greater level of generating capacity to offset the lack of energy when the sun is not available. However, nuclear reactors can run 100% of the time, and thus, require less installed capacity relative to solar systems.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations that are different than those which are disclosed. Therefore, although the invention has been described based upon these embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A mobile heat pipe cooled reactor system, comprising:
a core block;
a plurality of heat pipes comprising coolant, a portion of each of the plurality of heat pipes extending into the core block and another portion of each of the plurality of heat pipes extending outward from the core block;
a plurality of fuel pins containing nuclear fuel, the plurality of fuel pins located within the core block and positioned proximate to the portions of the plurality of heat pipes extending into the core block;
a decay heat exchanger located outside the core block and surrounding part of the portion of each of the plurality of heat pipes extending outward from the core block, the decay heat exchanger configured to perform decay heat removal;
shielding located between the decay heat exchanger and the core block; and
an active heat exchanger outside the core block and surrounding another part of the portion of each of the plurality of heat pipes extending outward from the core block, wherein
the plurality of heat pipes are operably connected to the core block, the decay heat exchanger and the active heat exchanger,
the plurality of heat pipes are configured to transfer heat away from the core block to an outside of the reactor system through the active heat exchanger, the decay heat exchanger, or both, and
the decay heat exchanger is located closer to the core block than the active heat exchanger.

2. The mobile heat pipe cooled reactor system of claim 1, further comprising:
a gas plenum located between the decay heat exchanger and the core block.

3. The mobile heat pipe cooled reactor system of claim 2, further comprising:
a reflector located between the gas plenum and the core block.

4. The mobile heat pipe cooled reactor system of claim 3, further comprising:
a lower plenum located between the decay heat exchanger and the active heat exchanger.

5. The mobile heat pipe cooled reactor system of claim 4, further comprising:
an upper plenum, wherein
the active heat exchanger is located between the upper plenum and the lower plenum.

6. The mobile heat pipe cooled reactor system of claim 1, wherein the core block comprises a plurality of segments.

7. The mobile heat pipe cooled reactor system of claim 6, wherein the segments of the plurality of segments are mechanically and thermally isolated from each other.

8. The mobile heat pipe cooled reactor system of claim 7, wherein the segments of the plurality of segments are neutronically connected to each other.

9. A reactor system, comprising:
a core block;
a plurality of heat pipes, a portion of each of the plurality of heat pipes extending into the core block and another portion of each of the plurality of heat pipes extending outward from the core block;
a plurality of fuel pins containing nuclear fuel, the plurality of fuel pins located within the core block and positioned proximate to the portions of the plurality of heat pipes extending into the core block;
a decay heat exchanger located outside the core block and surrounding part of the portion of each of the plurality of heat pipes extending outward from the core block, the decay heat exchanger configured to perform decay heat removal; and
an active heat exchanger located outside the core block and surrounding another part of the portion of each of the plurality of heat pipes extending outward from the core block, wherein
the decay heat exchanger is located closer to the core block than the active heat exchanger.

10. The reactor system of claim 9, further comprising:
a gap between the decay heat exchanger and the core block.

11. The reactor system of claim 9, further comprising:
shielding located between the decay heat exchanger and the core block.

12. The reactor system of claim 9, further comprising:
a gap between the decay heat exchanger and the active heat exchanger.

13. The reactor system of claim 9, wherein the core block comprises a plurality of segments.

14. The reactor system of claim 13, wherein the segments of the plurality of segments are mechanically isolated from each other.

15. The reactor system of claim 14, wherein the segments of the plurality of segments are thermally isolated from each other.

16. The reactor system of claim 15, wherein the segments of the plurality of segments are neutronically connected to each other.

17. A reactor system, comprising:

a core block;

a plurality of heat pipes, a portion of each of the plurality of heat pipes extending into the core block and another portion of each of the plurality of heat pipes extending outward from the core block;

a decay heat exchanger located outside the core block and surrounding part of the portion of each of the plurality of heat pipes extending outward from the core block, the decay heat exchanger configured to perform decay heat removal; and an active heat exchanger located outside the core block and surrounding another part of the portion of each of the plurality of heat pipes extending outward from the core block, wherein the decay heat exchanger is located closer to the core block than the active heat exchanger.

18. The reactor system of claim 17, further comprising:

a gap between the decay heat exchanger and the core block.

19. The reactor system of claim 17, further comprising:

shielding located between the decay heat exchanger and the core block.

20. The reactor system of claim 17, further comprising:

a reflector located between the decay heat exchanger and the core block.

* * * * *